United States Patent [19]

Possati et al.

[11] 4,030,201

[45] June 21, 1977

[54] METHOD AND RELEVANT APPARATUS FOR DETECTING THE GEOMETRICAL FEATURES OF MECHANICAL WORKPIECES, IN PARTICULAR FOR MEASURING THE ECCENTRICITY AND OUT-OF-ROUNDNESS

[75] Inventors: Mario Possati; Franco Danielli, both of Bologna, Italy

[73] Assignee: Finike Italiana Marposs-Soc. In Accomandita Semplice di Mario Possati & C., Bentivoglio, Italy

[22] Filed: Sept. 2, 1975

[21] Appl. No.: 609,739

Related U.S. Application Data

[63] Continuation of Ser. No. 462,426, April 19, 1974, abandoned.

[30] Foreign Application Priority Data

Apr. 19, 1973 Italy .................................. 3383/73

[52] U.S. Cl. ............................................. 33/174 Q
[51] Int. Cl.² ....................... G01B 5/25; G01B 7/31
[58] Field of Search ......... 33/174 L, 174 Q, 178 R, 33/178 E, 180 AT, 181 AT

[56] References Cited

UNITED STATES PATENTS

| | | | |
|---|---|---|---|
| 2,553,129 | 5/1951 | Burnett | 33/174 L |
| 2,659,157 | 11/1953 | Aller | 33/178 R |
| 2,765,539 | 10/1956 | Sear | 33/181 AT |
| 3,125,811 | 3/1964 | Pierce et al. | 33/174 Q |
| 3,254,416 | 6/1966 | Eisele | 33/174 Q |
| 3,534,480 | 10/1970 | Webb | 33/174 Q |

*Primary Examiner*—Charles E. Phillips
*Attorney, Agent, or Firm*—Stevens, Davis, Miller & Mosher

[57] ABSTRACT

The present invention relates to a method and apparatus for detecting the geometrical features of mechanical workpieces, particularly for measuring eccentricity and out-of-roundness of cylindrical and revolution surfaces in which at least two size checks on relevant sections of the cylindrical surface and at least two size checks on the same section of the revolution surface are carried out and the data resulting from the checks are processed to supply an indication of the eccentricity of the two surfaces and of the roundness of the section of the revolution surface. The apparatus includes a plug carrying feelers which is automatically positioned with respect to a workpiece and then revolved, so that feelers carry out measurements. The apparatus is used for checking valve guide holes and valve seats of engines and similar workpieces.

9 Claims, 4 Drawing Figures

METHOD AND RELEVANT APPARATUS FOR DETECTING THE GEOMETRICAL FEATURES OF MECHANICAL WORKPIECES, IN PARTICULAR FOR MEASURING THE ECCENTRICITY AND OUT-OF-ROUNDNESS

This is a Continuation of application Ser. No. 462,426 filed Apr. 19, 1974 now abandoned.

The present invention relates to a method and apparatus for detecting the geometrical features of mechanical workpieces and particularly for measuring the eccentricity and the out-of-roundness of valve guide holes and valve seats of reciprocating internal combustion engines.

In the production of mechanical workpieces there is increasingly felt the advisability and often the necessity of carrying out exact size checks for both quality and safety.

This is particularly true in the production of automotive parts. Although it is always necessary to have laboratory devices to carry out very exact and sophisticated checks on samples drawn at random or by other criteria, in case of a high hourly output there is the trend also to carry out an increasing number of checks on all manufactured pieces.

Of course, in order to check the whole production it is necessary to adapt automatic or semi-automatic apparatuses to guage the workpieces without slowing down or stopping the productive process and to utilize a minimum of excess staff. On the other hand many workpieces have such a shape, size or weight as to make difficult this procedure.

At present there is an increasing need for ensuring a good seal of valves in their seats, in valve-type internal combustion engines, not only in view of the quality, efficiency, power, pickup but also to reduce air pollution.

As a matter of fact by improving the seating of the valve the combustion is improved and the pollution is reduced.

It is therefore an object of the present invention to provide a method and apparatus for measuring the eccentricity of valve seat surfaces with respect to the valve guide surfaces and the out-of-roundness of the valve seats of internal combustion engines or equivalent pieces or mechanical parts.

Another object is to provide a method and apparatus for eccentricity and out-of-roundness measurement on mass produced parts on a full automatic or semi-automatic basis.

These and other goals and advantages are achieved by a method to detect the geometrical features of workpieces including a cylindrical surface and another revolution surface, having theoretically a circular section and being coaxial with the cylindrical surface. The method according to the present invention carries out at least two size checks on relevant sections of the cylindrical surface and at least two size checks on the same section of the revolution surface, the first and second checks being carried out substantially along the whole perimeter of the sections. The processing of the data resulting from the two first and two second checks supplies an indication of eccentricity of the two surfaces. The out-of-roundness of the revolution surface with a circular section is measured on the basis of the processing of the data resulting from the two second size checks.

According to the present invention, in the case of measures on a valve guide hole and a valve-seat in the head of an engine block, the first size checks are carried out on two different sections of the valve guide hole and the second size checks on the same section of the valve seat.

An apparatus embodying the method of the present invention is characterized by devices adapted to support the piece and to position it with respect to a support and protection device for a number of measuring organs adapted to detect linear sizes or deviations from preset dimensions. The measuring organs comprise first and second detecting elements, preferably with direct contact feelers, adapted to cooperate with relevant sections of the cylindrical surface of the peice, and third and fourth detecting elements, preferably with direct contact feelers, adapted to cooperate with the same section of the revolution surface, driving means being foreseen to operate the support and protection device in order to permit the detecting elements to scan the perimeter of the sections. The first, second, third and fourth detecting elements are associated to per se known electric circuits adapted to provide signals responsive to the detected sizes, the signals responsive to the sizes detected by said first, second, third and fourth detecting elements being brought to a first processing unit adapted to gauge the eccentricity, the signals responsive to the sizes detected by said third and fourth detecting elements being besides brought to a second processing unit adapted to gauge the out of roundness.

The present invention will be described further according to preferred but not limiting embodiments with reference to the attached tables of drawings in which equal or equivalent parts are marked by the same reference indexes and in which.

Figure 1:
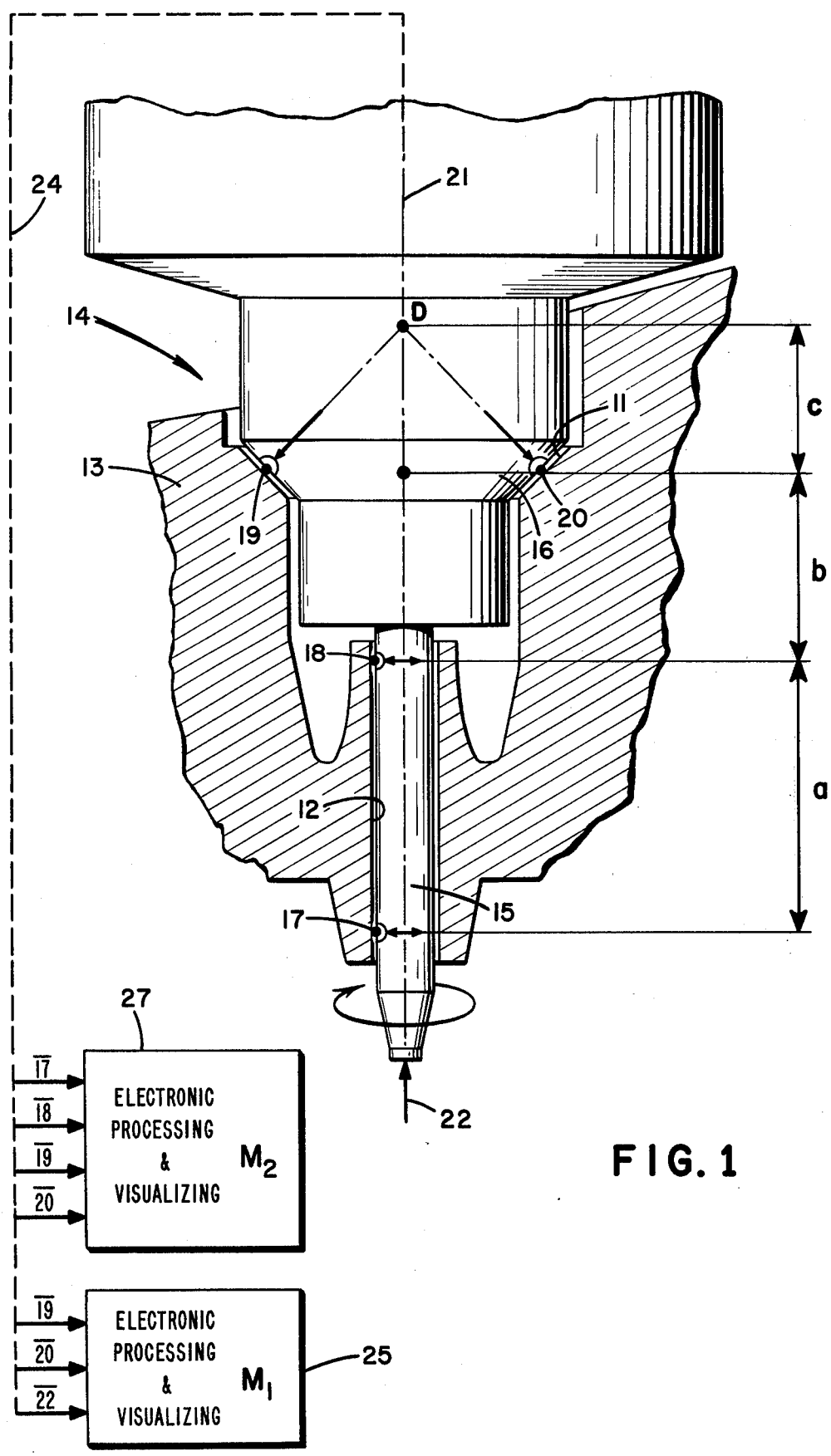
FIG. 1 illustrates generally the present invention for measuring the eccentricity of a valve seat with respect to a valve guide hole and the out-of-roundness of the valve seat.

With reference to FIG. 1, the measuring problem being considered consists in checking the eccentricity between a valve seat 11 and the relevant valve guide hole 12 of a head 13 of an engine block and the shape of valve seat 11.

Such checking is carried out by a plug 14 including a cylindrical section 15 and a frusto-conical section 16 which protect moving arms (not visible) carrying relevant feelers 17, 18, 19, 20. After head 13 has been positioned, as described later, plug 14 is displaced towards it so as to take the position of FIG. 1. Then plug 14 is revolved one complete revolution.

Feelers 17, 18, 19, 20 are free to move in the directions shown by the relevant arrows. Feelers 17, 18 move in a direction normal to the axis 21 of plug 14 while feelers 19, 20 form an angle of 45° with the same axis 21, as evidenced by the lines meeting at a point D, a distance above 19 and 20 equal to the distance of 19 and 20 from axis 21.

Another feeler 22 detects possible displacements of plug 14 in an axial direction and gives a compensating signal.

The displacements detected by feelers 17, 18, 19, 20, 22 are transformed into electrical signals.

In particular each feeler is associated with an inductive position transducer and with detecting circuits and forms an electronic gauge together with them.

These electronic gauges are per se known. Therefore, their structure and operation do not fall within the present invention and therefore are not described further.

After indicating by $\overline{17}, \overline{18}, \overline{19}, \overline{20}, \overline{22}$ the electric signals given by the gauges comprising respectively feelers 17, 18, 19, 20, 22, the "out-of-roundness" of valve seat 11 is reckoned on the basis of the expression:

$$M_1 = \left[\frac{\overline{19}+\overline{20}}{\sqrt{2}} - \overline{22}\right]_{Max} - \left[\frac{\overline{19}+\overline{20}}{\sqrt{2}} - \overline{22}\right]_{min} \quad (1)$$

The eccentricity (run out) of valve seat 11 with respect to valve guide 12 is reckoned on the basis of the expression:

$$M_2 = \left[\overline{18} - \overline{17}\frac{b+c}{a+b+c} - \frac{\overline{19}-\overline{20}}{\sqrt{2}}\frac{a}{a+b+c}\right]_{Max} -$$

$$\left[\overline{18} - \overline{17}\frac{b+c}{a+b+c} - \frac{\overline{19}-\overline{20}}{\sqrt{2}}\frac{a}{a+b+c}\right]_{min} \quad (2)$$

The meaning of $a$, $b$, $c$ will be explained later.

The roundness error $M_1$ is provided substantially as the maximum variation of the diameter measure in the section of valve seat 11 where feelers 19, 20 work, during the rotation of plug 14, with the compensation (due to signal 22) of possible axial displacements of the plug itself.

It can be demonstrated that the eccentricity $M_2$ as expressed in (2) represents the eccentricity of the center of the section of valve guide hole 12, on which feeler 18 works, with respect to the line joining point D with the center of the section of valve guide hole 12 contacted by feeler 17. In the expression (2) the terms containing 17, 19 and 20 depend on the position of said line with respect to the axis 21 of plug 14.

In the expression (2) the quantities $a$, $b$, represent respectively the distances along the axis 21 of the section of the plug in which lies feeler 18 from the section in which lies feeler 17 and respectively from that in which lies feelers 19, 20.

The quantity $c$ represents the distance of the center of the section in which lie feelers 19, 20 from point D.

In an analogous way it is possible to reckon the eccentricity of one (whichever it is) of the three sections contacted respectively by feeler 17, by feeler 18 and by feelers 19, 20 with regard to the intersection of the line joining point D with the center of another of the three sections or the intersection of the line joining the centers of the two other sections.

As it is shown in the figure, feelers 17, 18, 19, 20 lie on the same meridian plane of plug 14.

It can be demonstrated that possible displacements of the axis of plug 14 during the measurement, both in an axial and in a transverse direction, do not affect the measurement of the eccentricity.

As for the measurement of the out-of-roundness, the displacements in an axial direction are compensated by the signal detected by feeler 22. Other displacements do not influence it appreciably.

In FIG. 1 the dashed line 24 represents a cable containing the output electric conductors of the gauges and units 25, 27 are electronic processing and visualizing groups adapted to reckon $M_1$ and $M_2$ according to the expressions (1) and (2).

Figure 2:
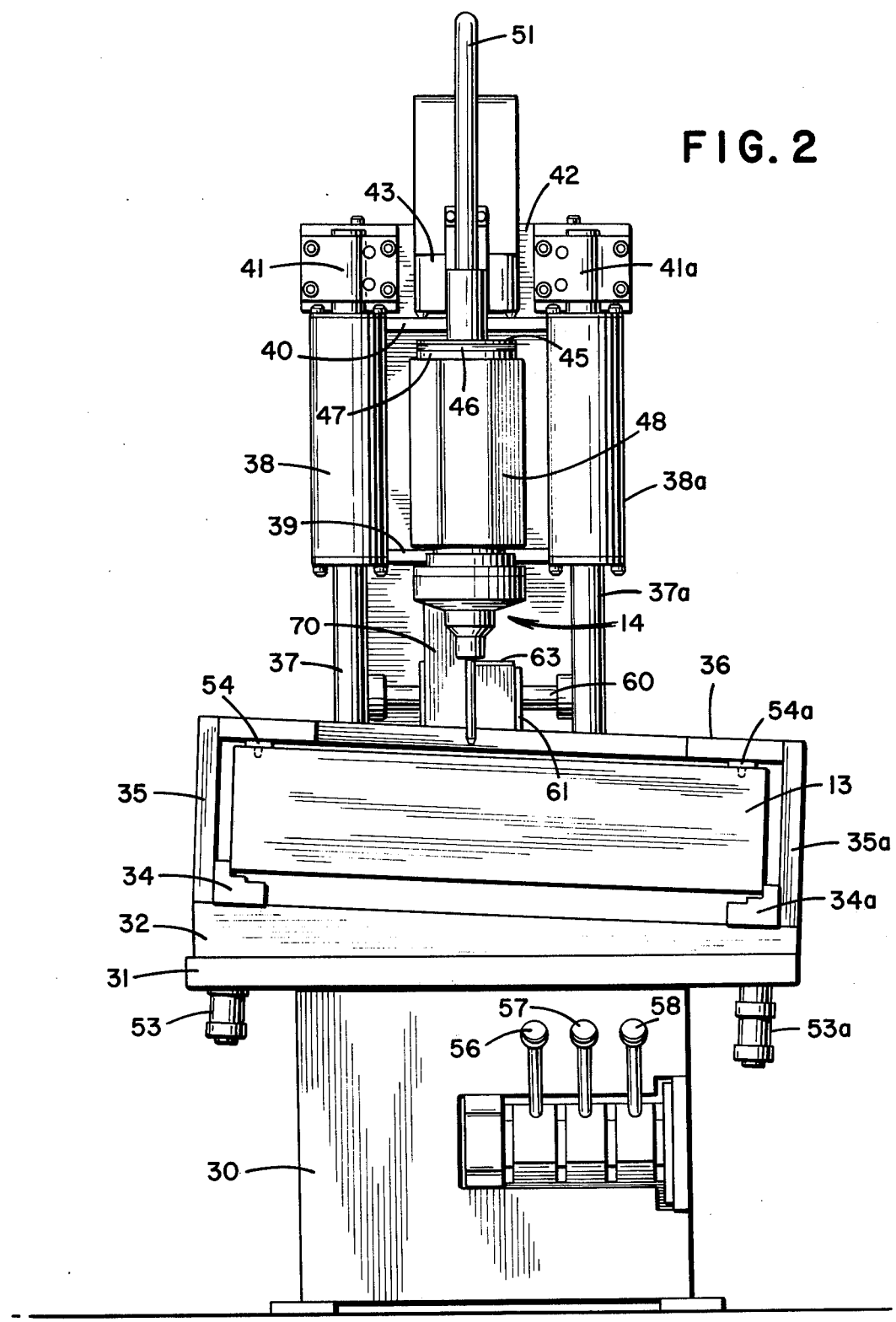
FIG. 2 is a front elevational view of an apparatus according to the present invention.
Figure 3:
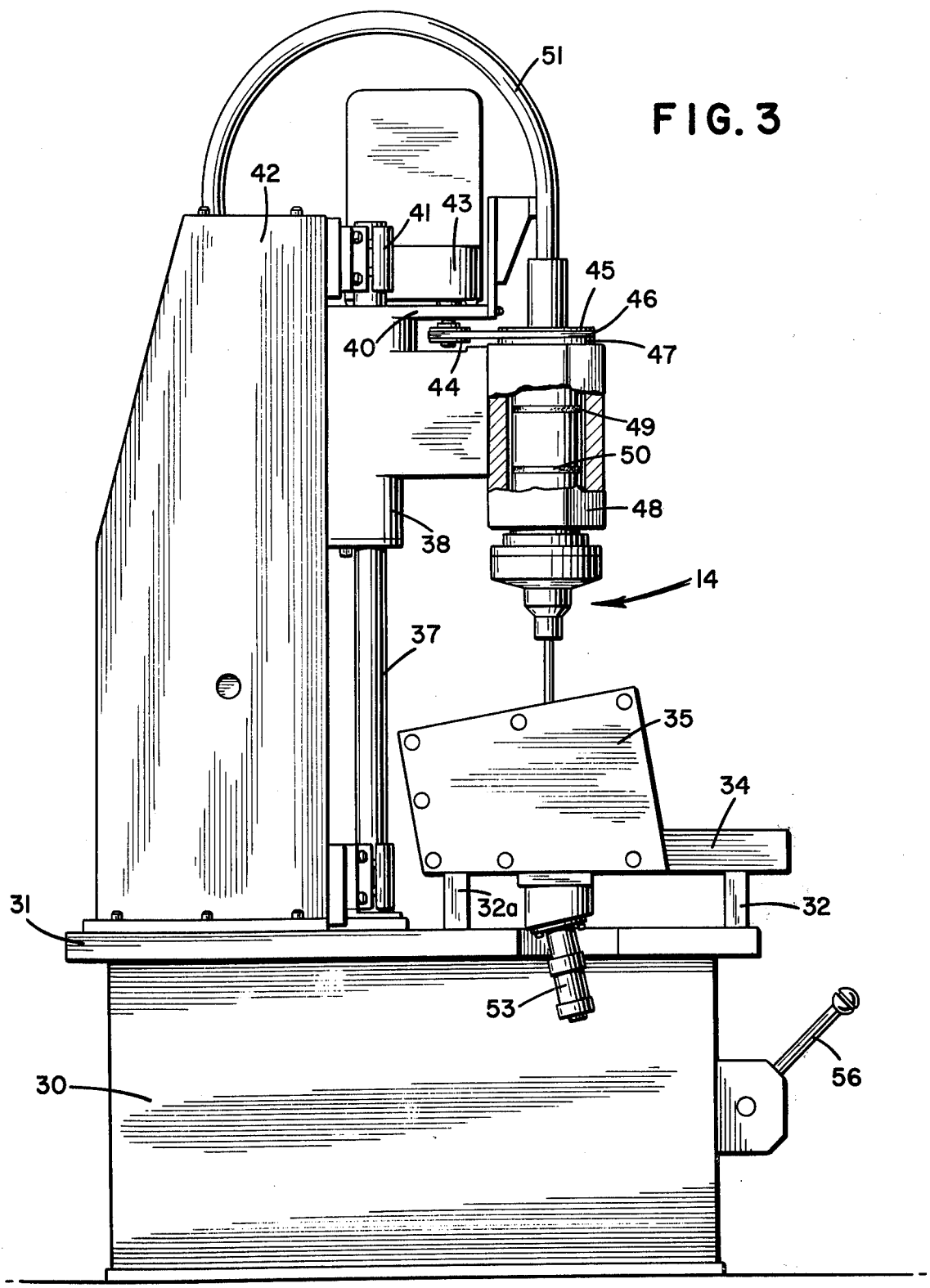
FIG. 3 is a side elevational view of the apparatus of FIG. 2 with some details shown schematically in section.

With reference to FIGS. 2, 3, the apparatus shown here includes a base 30 for a bench 31 supporting guides 34, 34a and lateral plates 35, 35a by means of cross members 32, 32a.

Lateral plates 35, 35a together with an upper plate 36 form a housing into which head 13 is inserted through slide guides 34, 34a.

Additionally, bench 31 supports two cylindrical vertical columns 37, 37a along which two slides can slide, these slides include cylindrical shells 38, 38a connected by a cross member 39 and an upper plate 40.

Through sleeves 41, 41a the upper ends of columns 37, 37a are fixed to a stanchion 42.

Upper plate 40 supports a motor 43 which, through pulleys 44, 45 and a belt 46, can rotate a spindle 47 revolving in an outer sleeve 48 supported by cylindrical shells 38, 38a. Spindle 47 supports plug 14 by two resilient joints 49, 50. In case of little displacements, the suspension behaves like a double universal joint. Hose 51 holds electric cables and pneumatic pipes.

Figure 4:
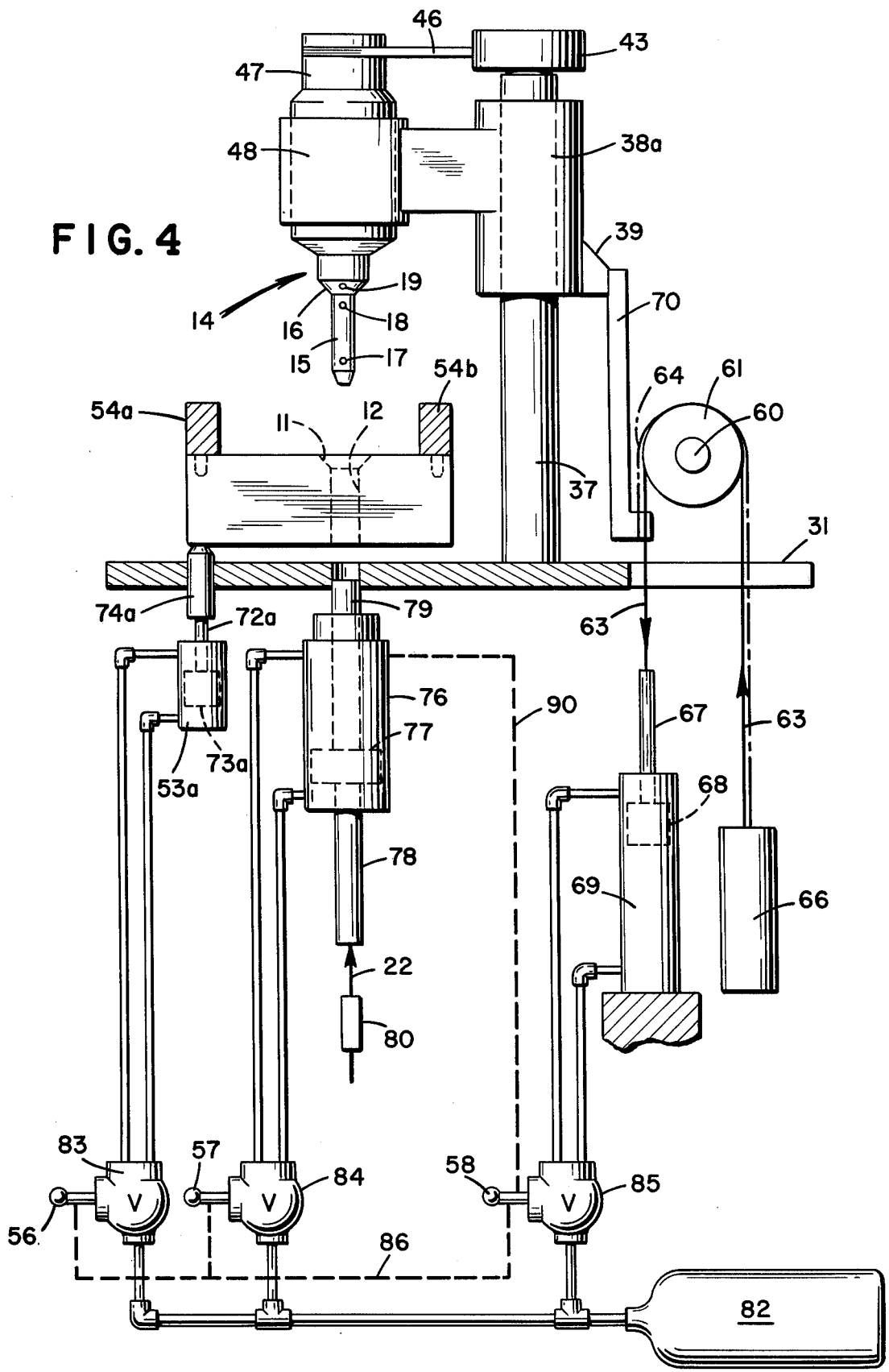
FIG. 4 is a simplified schematic illustration of one of the apparatus of FIGS. 2 and 3.

Two pneumatic cylinders 53, 53a serve to position head 13 against reference elements of which two 54, 54a are visible in FIG. 2 and another, 54b can be seen in FIG. 4.

Three levers 56, 57, 58 serve to operate the apparatus. Furthermore stanchion 42 supports a shaft 60 on which a pulley 61 is mounted acting as a guide for two flexible belts 63, 64 (FIGS. 3, 4).

Both belts 63, 64 are fixed on one side to a counterweight 66, whereas on the opposite side they are fixed, respectively, to rod 67 of piston 68 of a pneumatic cylinder 69 and to a bar 70 integral with cross member 39.

The piston rods of cylinders 53, 53a are operatively connected to thrust elements necessary to bring head 13 into the measuring position and to keep it there.

In FIG. 4 there are shown rod 72a, piston 73a and thrust element 74a of cylinder 53a.

In FIG. 4 there is also shown another pneumatic cylinder 76 to the piston 77 of which a double rod 78 is associated.

One end of double rod 78 carries a stem 79 whereas the other end cooperates with feeler 22 (described with reference to FIG. 1) of a relevant measuring head 80 mounted in the base 30.

Cylinders 53, 53a, 69, 76 are fed by a compressed air source 82 through relevant valves 83, 85, 84.

Levers 56, 57, 58 serve to operate valves 83, 84, 85. Moreover between the levers are some locks so that lever 57 can be operated only after the operation of lever 56 and lever 58 only after the operation of levers 56, 57.

This is symbolically indicated by dashed line 86. Moreover lever 58 has another lock depending on the position of piston 77 in cylinder 76.

The locks acting on levers 56, 57, 58 are per se known, formed for example of ratchet gears (not shown) which act on the relevant axes of rotation of the levers.

The operation of the apparatus is as follows:

Head 13 is inserted into the housing formed by plates 35, 35a, 36 by causing it to slide on guides 34, 34a.

By operating lever 56 valve 83 is opened and therefore thrust element 74a and the other element associated to the piston of cylinder 53 raise head 13 and position it against reference elements 54, 54a, 54b. Then lever 57 is lowered and valve 84 thereby is opened.

Stem 79 rises and, if head 13 is in a correct position and valve guide hole 12 is not at all out of tolerance so far as the sizes, shape and inclination of the axis are concerned, it is fully inserted into valve guide hole 12 itself.

Only in such a case it is possible to operate the third lever 58, too.

As a matter of fact, if stem 79 can not fully enter valve guide hole 12, in a pipe 90 of cylinder 76 there is a pressure insufficient to release the second lock of lever 58, mentioned formerly.

If, on the contrary, such lock is released it is possible to lower lever 58; in such a manner plug 14 is caused to descend, it being sure that parts 15, 16 of it can enter valve guide hole 12 and valve seat 11 without any damage and jamming.

The lower end of part 15 of plug 14 makes stem 79 move back but it keeps in touch with the latter.

Then a mechanical reference or a microswitch (not shown) stops the descent of the plug which stops in the position shown in FIG. 1.

Afterwards motor 43 is operated which makes plug 14 turn one revolution up to a reference element (not shown) and the measurement is carried out as explained with reference to FIG. 1. Then motor 43 causes plug 14 to turn back and the operator, bringing levers 58, 57, 56 successively into the rest position, makes the apparatus take the starting conditions again. During the rotation of plug 14 and the carrying out of the measurements, possible displacements in an axial direction of the plug itself are compensated for by the signal supplied by head 80, as mentioned formerly.

To make the illustration easier an apparatus is shown adapted to carry out the measurements on only one valve seat and its relevant valve guide hole.

In practice the apparatus may include several plugs to check all valve seats and valve guide holes of a head.

It also is possible to use a single plug and carry out the measurements in succession, by advisable displacements of the plug and of the head.

Besides it has to be borne in mind that the number of the feelers and the relevant gauges associated with each plug can be increased. In particular, if the valve guide hole has a sufficiently large diameter, two diametrically opposed feelers can be arranged on each of the two formerly mentioned sections of it.

The number of the feelers contacting the valve seat can be increased, too.

In such a way the precision and/or the definition of the information on the measurement rise, thus entailing increased costs and more complex circuitry.

Furthermore, it is evident that the apparatus can be fully automated and the pneumatic checking and control elements replaced by suitable electric circuits.

Ultimately other variants and changes, besides the ones already mentioned, can be made to the method and apparatus described formerly without extending beyond the scope of the invention.

What is claimed is:

1. A method for determining the cross-section out-of-roundness of a revolution surface of a workpiece and the eccentricity of the revolution surface relatively to a right circular cylindrical surface of the workpiece by using a measuring means adapted to carry out measurements of linear dimensions and to provide electric signals depending on said dimensions, comprising:

defining a measurement reference axis, substantially parallel to the axis of the cylindrical surface; defining a measurement reference point on said reference axis;

carrying out first and second measurements of linear dimensions on a first point of a first cross-section and, respectively, a second point of a second cross-section of the right circular cylindrical surface, the first and second cross-sections being perpendicular to the reference axis and located at a known distance from each other, said step of carrying out first and second measurements including obtaining first and second electric signals depending on linear dimensions in directions perpendicular to said measurement reference axis, said directions coinciding substantially with diametral directions of said cross-sections, and third and fourth measurements of linear dimensions on opposed points of a cross-section of the revolution surface, this cross-section being perpendicular to said reference axis and located at known distances from said cross-sections of the right circular cylindrical surface, said third and fourth measurements including obtaining third and fourth electric signals responsive to the distance of said opposed points from said measurement reference point, said first and second points being coplanar with said opposed points;

repeating said first, second, third and fourth measurements along the whole perimeters of said cross-sections; processing said third and fourth signals to supply an indication of said out-of-roundness, said processing step including continuously electrically combining the third and fourth signals to obtain a combined signal responsive to the diameter of said cross-section of the revolution surface and evaluating the difference between the maximum and minimum values of said combined signals; and processing said first, second, third and fourth signals to supply an indication of said eccentricity, this processing step including continuously obtaining a linear combination signal of said first, second, third and fourth signals and evaluating the difference between the maximum and minimum values of said combination signal to express the eccentricity as the distance between the center of one of said cross-sections of the revolution surface and cylindrical surface and a reference line defined by the other two cross-sections.

2. The method according to claim 1 wherein said revolution surface is the surface of a frusto-conical valve seat and said right circular cylindrical surface is the surface of the relevant valve guide.

3. A method for measuring the out-of-roundness of a valve seat surface and the runout of the valve seat surface in respect of the relevant valve guide surface by using a measuring means adapted to carry out measurements of linear dimensions and to provide electric signals depending on said dimensions, comprising the steps of:

defining a measurement reference axis substantially parallel to the axis of the valve guide surface; defining a measurement reference point on said reference axis;

measuring first dimensions on a first cross-section of the valve guide surface, continuously along the perimeter thereof and perpendicularly to said reference axis, this measuring step including obtaining first electrical signal responsive to said dimensions;

measuring second dimensions on a second cross-section of the valve guide surface, continuously along the perimeter thereof and perpendicularly to said reference axis, this measuring step including obtaining a second electrical signal responsive to said second dimensions and being carried out simultaneously with the preceding step, the first and second cross-sections being perpendicular to the reference axis and located at a known distance from each other;

measuring third dimensions on a cross-section of the valve seat surface, continuously along the perimeter thereof and with reference to said reference point, this measuring step including obtaining a third electrical signal responsive to said third dimensions and being carried out simultaneously with the preceding step, the cross-section of the valve seat surface being perpendicular to the reference axis and located at known distances from said cross-sections of the valve guide surface;

measuring fourth dimensions on said cross-section of the valve seat surface, continuously along the perimeter thereof and with reference to said reference point, this measuring step including obtaining a fourth electrical signal responsive to said fourth dimensions and being carried out simultaneously with the preceding step, said first, second, third and fourth dimensions being at each time measured with reference to coplanar points of said cross-sections of the valve guide surface and the valve seat surface; processing said third and fourth electrical signals to obtain the out-of-roundness of the valve seat surface, this processing step including continuously electrically obtaining a linear combination of said third and fourth signals and obtaining the value of the difference of the maximum and minimum values of said combination;

processing said first, second, third and fourth signals to obtain said runout, this processing step including continuously obtaining a linear combination signal of said first, second, third and fourth signals and evaluating the difference between the maximum and minimum values of said combination signal to express the runout as the distance of the center of one of said first and second cross-sections of the valve guide surface and the cross-section of the valve seat surface from a reference line defined by the other two cross-sections.

4. A method for measuring the out-of-roundness of a cross-section of a revolution surface of a workpiece and its runout relatively to a reference right circular cylindrical surface of the same workpiece by using a measuring means adapted to carry out measurements of linear dimensions and to provide electric signals depending on said dimensions, comprising the steps of:

defining a measurement reference axis substantially parallel to the axis of the cylindrical surface; defining a measurement reference point on said reference axis;

continuously measuring first dimensions on a first cross-section of said right circular cylindrical surface, along the perimeter thereof and perpendicularly to said reference axis, this step including obtaining a first electrical signal responsive to said dimensions;

continuously measuring second dimensions on a second cross-section of said right circular cylindrical surface, along the perimeter thereof and perpendicularly to said reference axis, this step including obtaining a second electrical signal responsive to said second dimensions and being carried out simultaneously with the preceding step, the first and second cross-sections being perpendicular to the reference axis and located at a known distance from each other;

continuously measuring third dimensions on said cross-section of the revolution surface, along the perimeter thereof and with reference to said reference point, this step including obtaining a third electrical signal responsive to said third dimensions and being carried out simultaneously with the preceding step, the cross-section of the revolution surface being perpendicular to the reference axis and located at known distances from said cross-sections of the cylindrical surface;

continuously measuring fourth dimensions on said cross-section of the revolution surface, along the perimeter thereof and with reference to said reference point, this step including obtaining a fourth electrical signal responsive to said fourth dimensions and being carried out simultaneously with the preceding step, said first, second, third and fourth dimensions being at each time measured with reference to coplanar points of said cross-sections of the right circular surface and the revolution surface;

processing said third and fourth electrical signals to obtain the out-of-roundness of the cross-section of the revolution surface, this step including continuously electrically obtaining a combination signal of said third and fourth signals and obtaining the value of the difference between the maximum and minimum values of said combination; and processing said first, second, third and fourth signals for obtaining said runout, this processing step including continuously obtaining a combined linear signal of said first, second, third and fourth signals and evaluating the difference between the maximum and minimum values of said combined signal to express said runout as the distance of the center of one of said first and second cross-sections of the right circular cylindrical surface and the cross-section of the revolution surface from a reference line defined by the other two cross-sections.

5. An apparatus for measuring the cross-section out-of-roundness of an internal revolution surface of a piece and the eccentricity of the revolution surface relatively to an internal, adjacent, right circular cylindrical surface of the same piece, said internal surfaces defining a hole in the piece, comprising:

a base;

support means carried by the base, adapted to support the piece to be measured and to position it in a determind measuring position;

a support and protection device mobile relatively to said base, said support and protection device including a plug movable to enter into said hole, said plug defining a geometrical axis;

measuring means supported by said support and protection device and mobile together with the same to be displaced relatively to the piece for carrying out measurements of linear dimensions on it, said measuring means including:

first and second measuring elements mounted within said plug for cooperating with the perimeters of a first cross-section and, respectively, a second cross-section of said cylindrical surface to measure linear dimensions of the cross-sections, substantially in diametral directions thereof, said first and second cross-sections being perpendicular to said geometrical axis and located at a known distance from each other;

third and fourth measuring elements mounted within said plug for cooperating with the perimeter of a cross-section of said revolution surface to measure linear dimensions responsive to the radial values of said cross-section of the revolution surface, said cross-section of the revolution surface being perpendicular to said geometrical axis and located at known distances from said cross-sections of the cylindrical surface; and first, second, third and fourth transducer means coupled to said first, second, third and fourth measuring elements respectively, to provide signals responsive to the linear dimensions measured;

driving means coupled to said support and protection device to rotate said plug for permitting said measuring elements to scan the perimeters of said cross-sections of the cylindrical and revolution surfaces; and processing means for processing said signals responsive to the linear dimensions measured, said processing means including:

a first processing device connected to said first, second, third and fourth transducer means for processing the relevant signals and calculating said eccentricity; and a second processing device connected to said third and fourth transducer means for processing the relevant signals and calculating said cross-section out-of-roundness.

6. The apparatus according to claim 5, in which said means adapted to support and to position the piece comprise guides for the displacement of the piece towards said measuring position, positioning reference elements adapted to contact the piece, thrust elements for bringing the piece against said reference elements and pre-checking devices adapted to determine the possibility for said mobile support and protection device to correctly reach the measuring position.

7. The apparatus according to claim 6, in which said plug includes a first section defining an external right circular cylindrical surface and a second section, coaxial with the first section, defining an external revolution surface, and wherein said support and protection device further comprises a spindle axially movable relatively to said base and resilient joints coupling the spindle and the plug, the spindle being axially movable for bringing the plug to said measuring position into the workpiece hole and being rotatable by said driving means to rotate the plug.

8. The apparatus according to claim 7, further comprising control and consent means adapted to be operated in sequence and interlocked, said control and consent means being linked with said thrust elements for bringing the piece against the reference elements, said pre-checking devices and said driving means for axially displacing the spindle.

9. An apparatus for measuring the cross-section out-of-roundness of a valve seat surface of an engine block and the runout of the valve seat surface in respect of the relevant valve guide surface, comprising:

a base;

a support table, carried by the base, and including guides and reference elements to position the engine block in a determined measuring position;

a stanchion protruding above said support table;

slide means coupled to said stanchion and slidable there along in a vertical direction towards and away from the engine block;

first measuring means carried by said slide means and including:

a plug comprised of a cylindrical section adapted to enter into the valve guide and a frusto-conical section adapted to enter into the valve seat; said plug being rotatable on said slide means, substantially about the geometrical axis of said cylindrical section and frusto-conical section;

a first group and a second group of measuring feelers mounted within said plug and movable to contact the valve seat surface and the valve guide surface, respectively; and transducer means coupled to said measuring feelers;

drive means mounted on said slide means and coupled to said plug for rotating it to permit said measuring feelers to scan the perimeters of cross-sections of the valve seat surface and the valve guide surface, respectively, said cross-sections being perpendicular to said geometrical axis and located at known distances from one another; second measuring means carried by said base and including a movable feeler mounted to measure possible axial displacements of said plug during its rotation and a transducer coupled to said feelers; and electronic processing and visualizing means connected to said transducer means and to the transducer of the second measuring means to provide measurements of said out-of-roundness and runout.

* * * * *